United States Patent [19]

Nagao et al.

[11] Patent Number: 5,870,507
[45] Date of Patent: Feb. 9, 1999

[54] RIGIDITY CHECKING METHOD AND APPARATUS WITH THE RESULT FREED FROM THE INFLUENCE OF PICTURE RESOLUTIONS

[75] Inventors: Kenji Nagao, Yokohama; Mitsuaki Inaba; Yuichi Kobayakawa, both of Tokyo, all of Japan

[73] Assignee: Matsushita Electric Industrial Co., Ltd., Osaka, Japan

[21] Appl. No.: 780,908

[22] Filed: Jan. 9, 1997

[30] Foreign Application Priority Data

Jan. 17, 1996 [JP] Japan ................................. 8-023010

[51] Int. Cl.$^6$ .......................................................... G06K 9/00
[52] U.S. Cl. ............................................. 382/286; 382/181
[58] Field of Search .................................... 701/221, 302; 235/412; 244/3.2; 342/62; 382/100, 103, 104, 105, 107, 108, 114, 153, 154, 155, 181, 190, 192, 195, 199, 201, 202, 203, 204, 209, 217, 218, 224, 241, 242, 243, 266, 276, 277, 278, 279, 285, 286, 291, 293, 294, 307, 312, 316, 321

[56] References Cited

U.S. PATENT DOCUMENTS 4,783,744 11/1988 Yueh ....................................... 364/454

OTHER PUBLICATIONS

McReynolds, Daniel P., et al: "Rigidity Checking of 3D–Point Correspondences Under Perspective Projection", pp. 945–950. (ICCV95).

Primary Examiner—Leo H. Boudreau
Assistant Examiner—Bijan Tadayon
Attorney, Agent, or Firm—Lowe Hauptman Gopstein Gilman & Berner

[57] ABSTRACT

A rigidity checking method and apparatus is presented. A composite feature vector is first generated by combining three pairs of coordinates obtained for a feature point of a target object from three pictures of the target object. A covariance matrix of the compound feature vector is calculated by finding a product of a variance matrix comprising a variance of each element of the compound feature vector and the transposed matrix of the variance matrix. The rigidity of the target object is calculated by using the element of the covariance matrix and compared with a predetermined threshold to determine whether the target object is a rigid body. Thus, a rigidity checking is directly achieved from the joint distribution of feature points in the three pictures without assuming the coefficients of a set of constraint equations.

18 Claims, 3 Drawing Sheets

RIGIDITY CHECKING METHOD AND APPARATUS WITH THE RESULT FREED FROM THE INFLUENCE OF PICTURE RESOLUTIONS

BACKGROUND OF THE INVENTION

1. Field of the Invention

The present invention relates to a rigidity checking method and apparatus for effectively checking the rigidity of an object perceived by a automated robot of vehicle, or of an object indruding into the sensing field of monitor camera.

2. Description of the Prior Art

The distance between two arbitrary points on a rigid body remains unchanged even when the rigid body takes a force or moves. This property of the rigid body permits a decision to be made from an image sequence including a target body as to whether the target body is a rigid body or not.

A rigidity checking technique is described in detail by S. Ullman and R. Basri, Object Recognition by Liner Combination of the Model, IEEE Trans. PAMI (Pattern Analysis and Machine Intelligence). In this technique, assuming three pairs of coordinates of a feature point of the target object in three pictures taken at different times to be $(X_1, Y_1)$, $(X_2, Y_2)$ and $(X_3, Y_3)$, tests are made to see to what extent the coordinates $(X_1, Y_1)$, $(X_2, Y_2)$ and $(X_3, Y_3)$ satisfy the following linear constraint equations:

$$\alpha_1^1 S_1 + \beta_1^1 Y_1 + \gamma_1^1 X_2 + \omega_1^1 X_3 = 0, \quad (1)$$

$$\alpha_1^2 X_1 + \beta_1^2 Y_1 + \gamma_1^2 Y_2 + \omega_1^2 Y_3 = 0, \quad (2)$$

$$\alpha_2^1 X_1 + \beta_2^1 X_2 + \gamma_2^1 Y_2 + \omega_2^1 X_3 = 0, \quad (3)$$

$$\alpha_2^2 X_1 + \beta_2^2 X_2 + \gamma_2^2 Y_2 + \omega_2^2 X_3 = 0, \quad (4)$$

$$\alpha_3^1 X_1 + \beta_3^1 X_2 + \gamma_3^1 Y_3 + \omega_3^1 X_3 = 0, \text{ and} \quad (5)$$

$$\alpha_3^2 X_1 + \beta_3^2 X_2 + \gamma_3^2 Y_3 + \omega_3^2 X_3 = 0, \quad (6)$$

where $\alpha_i^j$, $\beta_i^j$, $\gamma_i^j$ and $\kappa_i^j$ are appropriate coefficients. Since a rigid body satisfies these constraint equations, the rigidity of the target object can be estimated by the extent to which the three pairs of coordinates satisfies the above constraint equations, that is, a satisfaction degree of the constraint equation.

In order to estimate the satisfaction degree, the optimum values are conventionally found for the coefficients of the constraint equations by means of least square error estimate by using a sufficient number of feature points. Then, the residue of each constraint equation is calculated as a satisfaction degree. It is determined that the smaller the residues or the satisfaction degrees are, the more rigidity the target object has.

However, the values of the constraint equations changes with a change in the resolutions of the three pictures. Since the resolutions of the pictures which have essentially nothing to do with the rigidity of the target object have effects on a judgement of the rigidity of the target object, the conventional rigid checking technique is not suitable for a general purpose tool.

Further, the conventional rigid checking technique requires calculations of the coefficients of the constraint equations which have no direct relationships with the rigidity of the target object, and accordingly is not effective.

SUMMARY OF THE INVENTION

It is therefore an object of the invention to provide a rigidity checking method and apparatus which has a raised efficiency and permits a wide use.

According to the present invention, a composite feature vector is first generated by combining three pairs of coordinates obtained for a feature point of a target object from three pictures of the target object; a covariance matrix of the compound feature vector is calculated by finding a product of a variance matrix comprising a variance of each element of the compound feature vector and the transposed matrix of the variance matrix; the rigidity of the target object is calculated by using the element of the covariance matrix; and the rigidity is compared with a predetermined threshold to determine whether the target object is a rigid body. Thus, a rigidity checking is directly achieved from the joint distribution of feature points in the three pictures without recovering the coefficients of a set of constraint equations for estimating the residue of each constraint equation as done in the prior art.

BRIEF DESCRIPTION OF THE DRAWINGS

Further objects and advantages of the present invention will be apparent from the following description of the preferred embodiments of the invention as illustrated in the accompanying drawings. In the drawings.

DETAILED DESCRIPTION OF THE PREFERRED EMBODIMENTS

Figure 1:
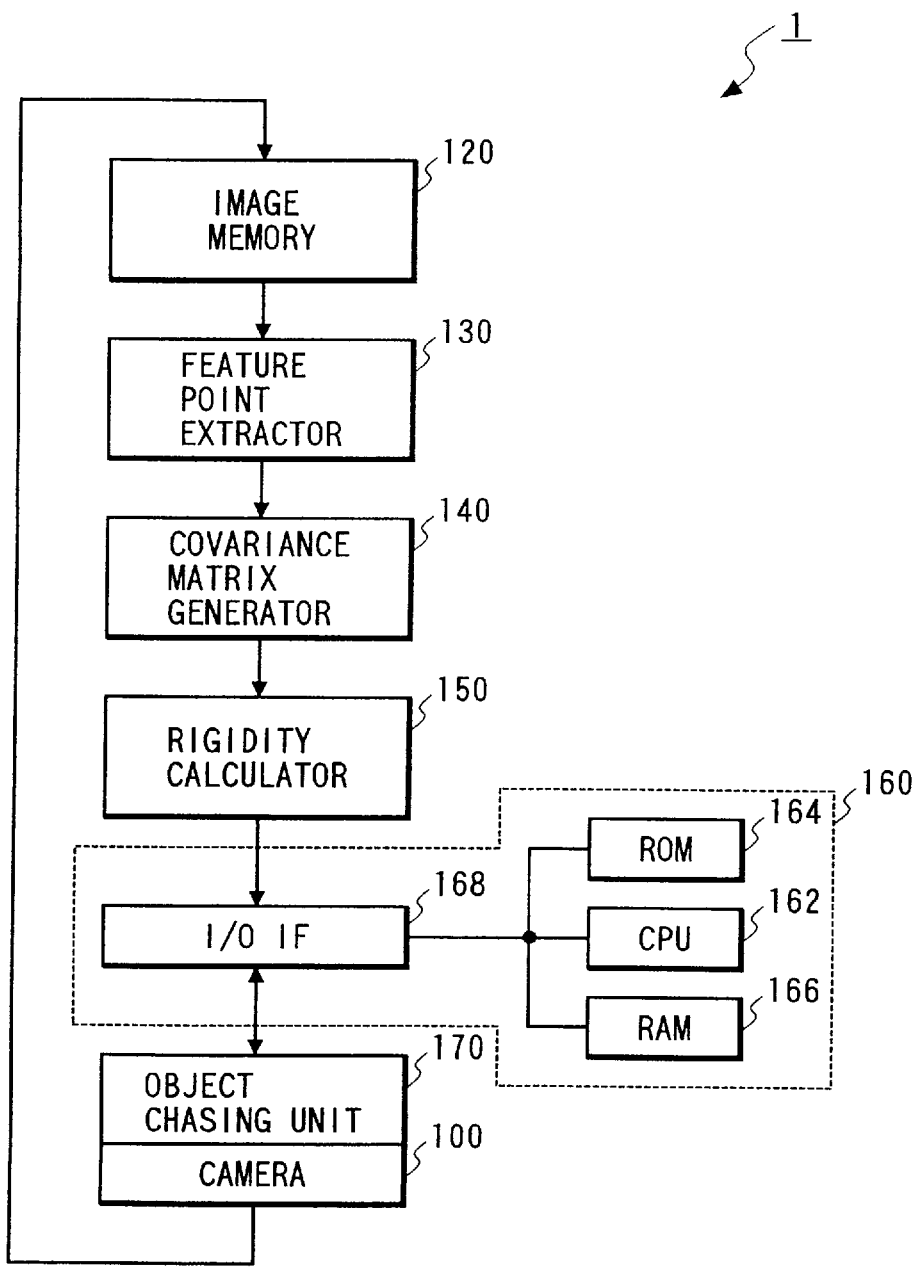
FIG. 1 is a block diagram showing a first illustrative embodiment of an object chasing system incorporating a rigidity checking apparatus realized with dedicated hardware according to the present invention.

FIG. 1 is a block diagram showing a first illustrative embodiment of an object chasing system incorporating a rigidity checking apparatus realized with dedicated hardware according to the present invention. In FIG. 1, the object chasing system 1 comprises a self-propelled object chasing unit 170, a camera 100 mounted on the object chasing unit 170, an image memory 120 for storing images supplied from the camera 100, a feature point extractor 130 for extracting a feature point of a target object from three images in the image memory 120 and complete a compound feature vector, a covariance matrix generator 140 for calculating a covariance matrix from the compound feature vector, a rigidity calculator 150 for calculating the rigidity of the target object by suing a equation comprising a combination of elements of the covariance matrix, and a controller 160 for controlling the object chasing unit 170 in response to the result of the rigidity checking by a comparison of the calculated rigidity with a predetermined threshold. The comparison may be executed by either the rigidity calculator 150 of the controller 160. The controller 160 comprises a central processing unit (CPU) 162, a read only memory (ROM) 164 for storing a program and data, a random access memory (RAM) 166, and an input and output interface (I/O IF) 168 as well known in the art.

Figure 2:
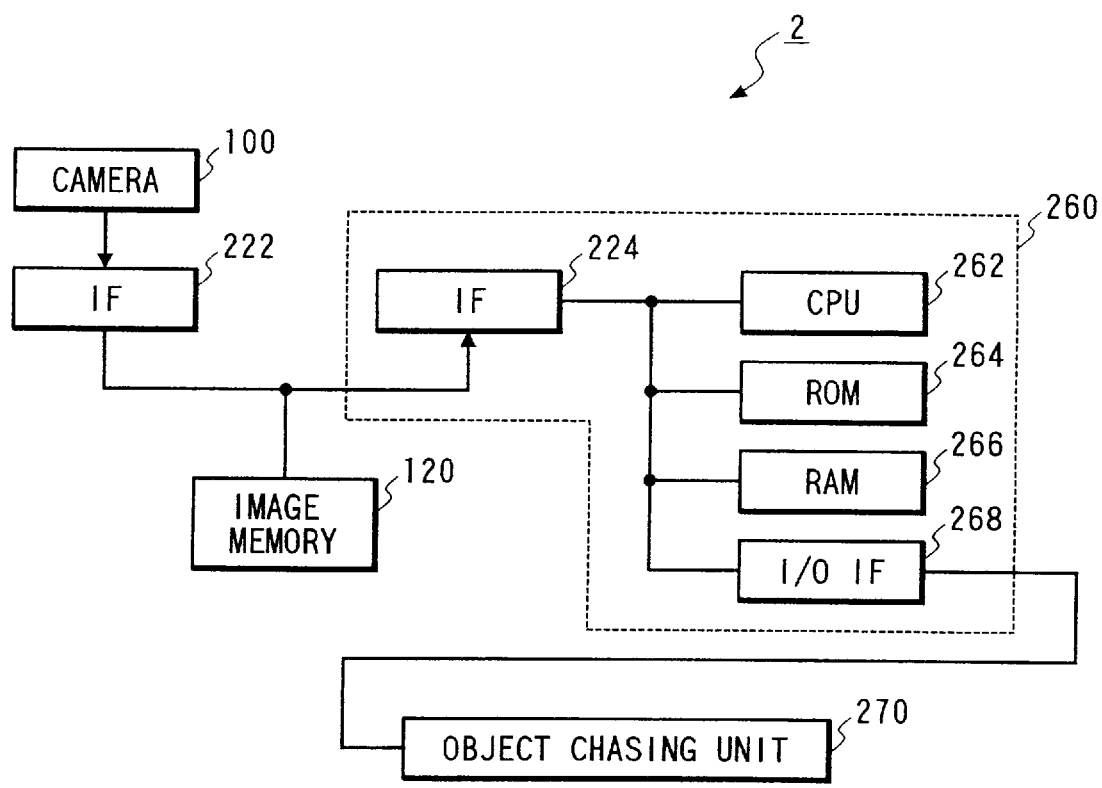
FIG. 2 is a block diagram showing a second illustrative embodiment of an object chasing system incorporating a rigidity checking apparatus realized with a microcomputer according to the present invention.

A similar object chasing system may be realized by using a microcomputer as shown in FIG. 2 instead of dedicated hardware such as the feature point extractor 130, the covariance generator 140 and the rigidity calculator 150. FIG. 2 is a block diagram showing a second illustrative embodiment of an object chasing system incorporating a rigidity checking apparatus realized with a microcomputer according to the present invention. In FIG. 2, the object chasing system 2 comprising a camera 100, an image memory 120, an input interface (IF) 222 through which an image data is supplied from the camera 100 to the memory 120, a microcomputer 260 for performing a rigidity checking, and an object chasing unit 270 which includes a controller (not shown) for controlling the unit 270 itself. The microcomputer 260 comprises a CPU 262, a ROM 262 for storing a program and data for rigidity checking, a RAM 266, an output interface 224 through which the image data is read from the memory 120, and an input and output interface (I/O IF) 268 through which the CPU 262 communicates with the controller (not shown) of the unit 270.

Figure 3:
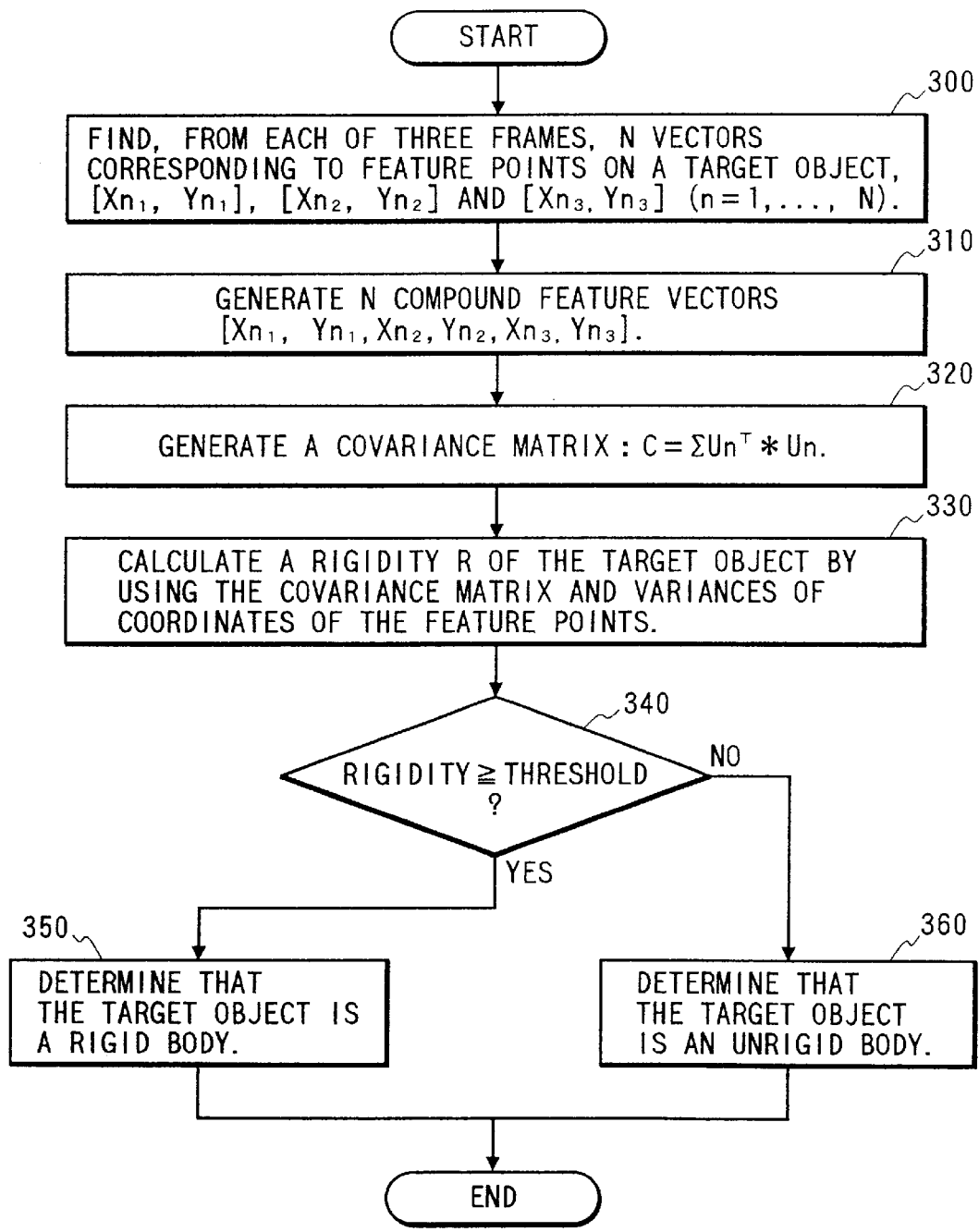
FIG. 3 is a flow chart showing a flow of a rigidity checking operation executed by each of the apparatuses shown in FIG. 1 and 2.

FIG. 3 is a flow chart showing a flow of a rigidity checking operation executed by the elements 130, 140, 150 and 162 in case of the apparatus 1 of FIG. 1 and by CPU 266 under the control of the program stored in ROM 266 in case of the apparatus 2 of FIG. 2. Therefore, the rigidity checking operation will be described referring to FIG. 1 and 3 in the following, where a description corresponding to any of the steps of FIG. 3 is indicated by a step number in parentheses.

An two-dimension (2-D) image of a target object is supplied to the memory 120 from the camera 100 mounted on the object chasing unit 170 (or 270).

Among the frames supplied from the camera 100, the feature point extractor 130 selects three frames in which the target object has moved sufficiently in distance, N+1 features points on the target object are selected from a first one of the three selected frames, corresponding N+1 feature points are found from each of the two remaining frames, and N 2-D feature point vectors from one of the N+1 feature points to the N other feature points are found for each of the three frames (step 300) and expressed as:

$[Xn_1, Yn_1]$ $[Xn_2, Yn_2]$ and $[Xn_3, Yn_3]$ where n=1 ..., N. Then, the feature point extractor 130 generates N 6-D compound feature vectors $[Xn_1, Xn_2, Yn_2, Xn_3, Yn_3]$ (step 310) by combining, for each of N feature points, three feature point vectors for the three frames into one vector.

The covariance matrix generator 140 generates the following covariance matrix (step 320):

$$C = \Sigma Un^T * Un \quad (\Sigma \text{ means a summation for } n=1, \ldots, N) \quad (7)$$

where $Un = (Xn_1 - \langle X_1 \rangle, Yn_1 - \langle Y_1 \rangle, Xn_2 - \langle X_2 \rangle, Yn_2 - \langle Y_2 \rangle, Xn_3 - \langle X_3 \rangle, Yn_3 - \langle Y_3 \rangle)$, $M^T$ is a transposed matrix of M, and $\langle X_i \rangle$ and $\langle Y_i \rangle$ are means of $Xn_i$ and $Yn_i$, respectively, that is:

$\langle X_i \rangle = (1/N)\Sigma Xn_i$ $\langle Y_i \rangle = (1/N)\Sigma Yn_i$ where $\Sigma$ is a summation for n=1, ..., N.

By using the covariance matrix and variances of coordinates of the feature points, the rigidity calculator 150 calculates a rigidity R of the target object (step 330):

$$R = 1 - (R_1^{\,1} + R_1^{\,2} + R_2^{\,1} R_2^{\,2} + R_3^{\,1} + R_3^{\,2})/6, \quad (8)$$

where $R_1^{\,1} \equiv \det(C1)/(\det(C2)C_{33}C_{55})$, $R_1^{\,2} \equiv \det(C3)/(\det(C2)C_{44}C_{66})$, $R_2^{\,1} \equiv \det(C4)/(\det(C5)C_{11}C_{55})$, $R_2^{\,2} \equiv \det(C6)/(\det(C5)C_{22}C_{66})$, $R_3^{\,1} \equiv \det(C7)/(\det(C8)C_{11}C_{33})$, and $R_3^{\,2} \equiv \det(C9)/(\det(C8)C_{22}C_{44})$, where det (M) is a determinant of matrix M, $C_{ij}$ is an (i,j) element of the covariance matrix C, and C1 through C9 are square matrices expressed as follows:

$$C1 = \begin{pmatrix} C_{11} & C_{12} & C_{13} & C_{15} \\ C_{21} & C_{22} & C_{23} & C_{25} \\ C_{31} & C_{32} & C_{33} & C_{35} \\ C_{51} & C_{52} & C_{53} & C_{55} \end{pmatrix} \quad (9)$$

$$C2 = \begin{pmatrix} C_{11} & C_{12} \\ C_{21} & C_{22} \end{pmatrix}$$

$$C3 = \begin{pmatrix} C_{11} & C_{12} & C_{14} & C_{16} \\ C_{21} & C_{22} & C_{24} & C_{26} \\ C_{41} & C_{42} & C_{44} & C_{46} \\ C_{61} & C_{62} & C_{64} & C_{66} \end{pmatrix}$$

$$C4 = \begin{pmatrix} C_{11} & C_{13} & C_{14} & C_{15} \\ C_{31} & C_{33} & C_{34} & C_{35} \\ C_{41} & C_{43} & C_{44} & C_{45} \\ C_{51} & C_{53} & C_{54} & C_{55} \end{pmatrix}$$

$$C5 = \begin{pmatrix} C_{33} & C_{34} \\ C_{43} & C_{44} \end{pmatrix}$$

$$C6 = \begin{pmatrix} C_{22} & C_{23} & C_{24} & C_{26} \\ C_{32} & C_{33} & C_{34} & C_{36} \\ C_{42} & C_{43} & C_{44} & C_{46} \\ C_{62} & C_{63} & C_{64} & C_{66} \end{pmatrix}$$

$$C7 = \begin{pmatrix} C_{11} & C_{13} & C_{15} & C_{16} \\ C_{31} & C_{33} & C_{35} & C_{36} \\ C_{51} & C_{53} & C_{55} & C_{56} \\ C_{61} & C_{63} & C_{65} & C_{66} \end{pmatrix}$$

$$C8 = \begin{pmatrix} C_{55} & C_{56} \\ C_{65} & C_{66} \end{pmatrix}$$

$$C9 = \begin{pmatrix} C_{21} & C_{24} & C_{25} & C_{26} \\ C_{42} & C_{44} & C_{45} & C_{46} \\ C_{52} & C_{54} & C_{55} & C_{56} \\ C_{62} & C_{64} & C_{65} & C_{66} \end{pmatrix}$$

The rigidity calculator 150 compares the calculated rigidity R with a predetermined threshold to see if the rigidity R is equal to or larger than the threshold. If so, the calculator 150 sends a signal indicative of a rigid body to the CPU 162, and otherwise sends the opposite signal indicative of a unrigid body to the CPU 162.

Alternatively, the rigidity calculator 150 sends the calculated rigidity R as it is to the CPU 162, which in turn compares the calculated rigidity R with a predetermined threshold to see if the rigidity R is equal to or larger than the threshold (step 340). If so, the CPU 162 determines that the target object is a rigid body (step 350), and otherwise determines that the target body is an unrigid body (step 360).

Subsequently, the CPUs 162 and 262 operate according to the result of the rigidity check.

Since the equation (8) has been used for estimating the rigidity, the propriety of the equation (8) will be described in the following.

As described above, if the target object is a rigid body, the components of the feature point vectors $[Xn_1, Yn_1]$, $[Xn_2, Yn_2]$ and $[Xn_3, Yn_3]$ will satisfy the above mentioned equations (1) through (6). Among the equations (1) through (6), Equations (1) and (2) concern the feature point $[Xn_1, Yn_1]$, equations (3) and (4) concern the feature point $[Xn_2, Yn_2]$, and equations (3) and (4) concern the feature point $[Xn_3, Yn_3]$.

It is well known as a property of Gramian (Gram determinant) that the equation (1) is equivalent to det[C1]. (See, for example, "Matrix Theory for System Control." Measurement and Automatic Control Society (of Japan) pp. 136–137.) That is, $$\alpha_1^1 X_1 + \beta_1^1 Y_1 + \gamma_1^1 X_2 + \omega_1^1 X_3 = 0 \longleftrightarrow \det[C1]=0 \quad (10)$$

For the sake of simplicity, only one feature point is considered here. For this reason, It is also well known from the geometric point of view that det[C1] is a quantity indicating the volume defined by four dimensional extent of the vector field of the vector $[X_1, Y_1, X_2, X_3]$ and that det[C1] is suitable for a quantity for estimating the dimensional degeneracy (degeneracy from four-dimensional extent to three-dimensional extent).

The meaning of the constraint equation remains unchanged even if the equation (1) is converted into the following equation by normalizing the distribution of the features contained in the equation (1):

$$a_1^1 X_1' + b_1^1 Y_1' + e_1^1 X_2' + f_1^1 X_3' = 0, \quad (11)$$

where there are following relations between $X_1'$, $Y_1'$ and $X_1$, $Y_1$, and between $a_1^1$, $b_1^1$ and $\alpha_1^1 + \beta_1^1$:

$$\begin{pmatrix} X_1' \\ Y_1' \end{pmatrix} = A \begin{pmatrix} X_1 \\ Y_1 \end{pmatrix}$$

where $$A = \Lambda^{-1/2} \Phi^T,$$

where $\Lambda$, $\Phi$ are respectively a proper matrix and a characteristic vector matrix of a matrix:

$$\begin{pmatrix} C_{11} & C_{21} \\ C_{21} & C_{22} \end{pmatrix},$$

and $\Lambda^{-1/2}$ is an inverse matrix of a square root matrix of the matrix $\Lambda$.

$$(a_1^1 b_1^1) = (\alpha_1^1 \beta_1^1) A^{-1}$$

Further, $X_2' = C_{33}^{-1/2} X_2$,
$e_1^1 = \gamma_1^1 C_{33}^{1/2}$,
$X_3' = C_{55}^{-1/2} X_3$, and
$f_1^1 = \Omega_1^1 C_{55}^{1/2}$.

Carrying out the above normalization not only prevents the estimation equation from being affected by the resolution of the frame in which feature points are recorded but also prevents the distribution of the feature points $((X_1, Y_1)$ in case of equation (11)) in the image plane from being subjected to a dimensional degeneracy.

Since estimating the determinant det[C1]=0 of the 4×4 covariance matrix of the vector composed of newly normalized distribution $[X_1, Y_1]$, $[X_2]$ and $[X_3]$ is equivalent to estimating the equation (1), in order for the value of det[C1] to be normalized into 0 through 1 in an estimation of the degree of satisfying det[C1]=0, the rigidity of the target is defined on the basis of the constraint equation (1) by the following expression:

$$1 - (\sigma_1 \sigma_2 \sigma_3 \sigma_4 / ((\sigma_1 + \sigma_2 + \sigma_3 + \sigma_4)/4)^4), \quad (12)$$

where $\sigma_1$, $\sigma_2$, $\sigma_3$ and $\sigma_4$ are eigenvalues of the covariance matrix for $(X_1', Y_1', X_2', X_3')$ in equation (11).

It is very well known as Schwarz's inequality that the equation (12) has been normalized into 0 through 1.

Finally, arranging the equation (12) yields:

$$1 - \det[C1]/\det[C2] C_{33} C_{55}. \quad (13)$$

where C1, C2, $C_{33}$ and $C_{55}$ are the same as those defined in conjunction with equations (9) and (7).

Since the same discussion can be applied to equations (2) through (6), the estimated value of the rigidity can be obtained by taking a mean of the estimates based on the constraint equations.

It is equation (2) that takes the mean. Therefore, in calculating the rigidity, the degree of the feature points satisfying the constraint equation which characterizes the property of a rigid body is calculated by combining the components of the covariance matrix. In other words, a rigidity checking system according to the invention judges the rigidity of a target directly from the joint distribution of the feature points instead of assuming the coefficients of the constraint equation and estimating the rigidity by using the residues of the constraint equation as in the prior art.

Also, normalizing, arranging and taking a means for each combination of constraint equations (1) and (2) concerning the feature point $(X_1, Y_1)$, constraint equations (3) and (4) concerning corresponding feature point $(X_2, Y_2)$, and constraint equations (5) and (6) concerning the feature point $(X_3, Y_3)$ yields the following expression as an expression for calculating the rigidity of the target object:

$$1 - (R_1 + R_2 + R_3)/3, \quad (14)$$

where $R_1 = \{\det\{C1\} + \det\{C3\}\}/\{\det\{C2\}(C_{33}C_{55} + C_{44}C_{66})\}$, $R_2 = \{\det\{C4\} + \det\{C6\}\}/\det\{\det\{C5\}(C_{11}C_{55} + C_{22}C_{66})\}$, and $R_3 = \{\det\{C7\} + \det\{C9\}\}/\{\det\{C8\}(C_{11}C_{33} + C_{22}C_{44})\}$.

The rigidity of the target object may be calculated by using the equation (14).

Normalizing, arranging and taking a means for the entirety of the constraint equations (1) through (6) yields the following expression as an expression for calculating the rigidity of the target object:

$$1 - R_0, \quad (15)$$

where $R_0 = \{\det\{C1\} + \det\{C3\} + \det\{C4\} + \det\{C6\} + \det\{C7\} + \det\{C9\}\}/\{\det\{C2\}(C_{33}C_{55} + C_{44}C_{66}) + \det\{C5\}(C_{11}C_{55} + C_{22}C_{66}) + \det\{C8\}(C_{11}C_{33} + C_{22}C_{44})\}$.

The rigidity of the target object may be calculated by using the equation (15).

Instead of using equation (8), the rigidity of the target object may be calculated by using the following equation:

$$Q_1^1 + Q_1^2 + Q_2^1 + Q_2^2 + Q_3^1 + Q_3^2, \quad (16)$$

where $$Q_1^1 \equiv \{(1-k)\det\{C2\}C_{33}C_{55} - \det\{C1\}\}/(1-k)\det\{C2\}C_{33}C_{55},$$

$$Q_1^2 \equiv \{(1-k)\det\{C2\}C_{44}C_{66} - \det\{C3\}\}/(1-k)\det\{C2\}C_{44}C_{66},$$

$$Q_2^1 \equiv \{(1-k)\det\{C5\}C_{11}C_{55} - \det\{C4\}\}/(1-k)\det\{C5\}C_{11}C_{55},$$

$$Q_2^2 \equiv \{(1-k)\det\{C5\}C_{22}C_{66} - \det\{C6\}\}/(1-k)\det\{C5\}C_{22}C_{66},$$

$$Q_3^1 \equiv \{(1-k)\det\{C8\}C_{11}C_{33} - \det\{C7\}\}/(1-k)\det\{C8\}C_{11}C_{33},$$

and $$Q_3^2 \equiv \{(1-k)\det\{C8\}C_{22}C_{44} - \det\{C9\}\}/(1-k)\det\{C8\}C_{22}C_{44},$$

where k is a constant and $0<k<1$. In this case, the rigidity of the target can be properly calculated by adjusting the value of k.

The rigidity of the target object may be calculated by suing the following equation into which the equation (14) has been modified:

$$Q_1 + Q_2 + Q_3, \qquad (17)$$

where $$Q_1 = \{(1-k)\det\{C2\}(C_{33}C_{55}+C_{44}C_{66}) - (\det\{C1\}+\det\{C3\})\}/(1-k)\det\{C2\}(C_{33}C_{55}+C_{44}C_{66}),$$

$$Q_2 = \{(1-k)\det\{C5\}(C_{11}C_{55}+C_{22}C_{66}) - (\det\{C4\}+\det\{C6\})\}/(1-k)\det\{C5\}(C_{11}C_{55}+C_{22}C_{66}), \text{ and}$$

$$Q_3 = \{(1-k)\det\{C8\}(C_{11}C_{33}+C_{22}C_{44}) - (\det\{C7\}+\det\{C9\})\}/(1-k)\det\{C8\}(C_{11}C_{33}+C_{22}C_{44}).$$

The rigidity of the target object may be calculated by using the following equation into which the equation (15) has been modified:

$$Q_O = \{(1-k)\{det\{C2\}(C_{33}C_{55}+C_{44}C_{66}) + \qquad (18)$$
$$det\{C5\}(C_{11}C_{55}+C_{22}C_{66}) + det\{C8\}(C_{11}C_{33}+C_{22}C_{44})\} -$$
$$(det\{C1\} + det\{C3\} + det\{C4\} + det\{C6\} + det\{C7\} +$$
$$det\{C9\})\}/(1-k)\{det\{C2\}(C_{33}C_{55}+C_{44}C_{66}) +$$
$$det\{C5\}(C_{11}C_{55}+C_{22}C_{66}) + det\{C8\}(C_{11}C_{33}+C_{22}C_{44})\}$$

If equation (17) or (18) is used, the rigidity of the target object can be properly calculated by adjusting the value of k.

Many widely different embodiments of the present invention may be constructed without departing from the spirit and scope of the present invention. It should be understood that the present invention is not limited to the specific embodiments described in the specification, except as defined in the appended claims.

What is claimed is:

1. In a rigidity checking system wherein a rigidity checking is achieved by using three pictures in which a target object is recorded as substantially moved in distance, a method of checking the rigidity R of the target object without being affected by the resolution of the pictures, comprising the steps of:

selecting N feature points of said target object and, for each of said N feature points, generating a 6-D compound feature vector from three 2-D feature vectors each indicative of the position of said feature point in corresponding one of said three pictures;

calculating a sum of a covariance matrix of each of said compound feature vectors for said N feature points to provide a summed covariance matrix C;

calculating said rigidity R by using components of said summed covariance matrix C; and comparing said rigidity R with a predetermined threshold to determine whether said target object is a rigid body or not.

2. A method as defined in claim 1, wherein said three feature vectors are $[Xn_1, Yn_1]$, $[Xn_2, Yn_2]$ and $[Xn_3, Yn_3]$, where $n=1, \ldots, N$ and 1, 2 and 3 corresponds to said three pictures and wherein:

said generating a 6-D compound feature vector comprises generating a vector $[Xn_1, Yn_1, Xn_2, Yn_2, Xn_3]$; and said step of calculating a sum comprises the steps of:

calculating said summed covariance matrix C as follows:

$$C = \Sigma Un^T * Un.$$

where $\Sigma$ indicates a summation for $n=1, \ldots, N$, $Un = (Xn_1 - <X_1>, Yn_1 - <Y_1>, Xn_2 - <X_2>, Yn_2 - <Y_2>, Xn_3 - <X_3>, Yn_3 - <Y_3>)$, and $M^T$ is a transposed matrix of M, where $$<X_i> = (1/N)\Sigma Xn_i$$

$$<Y_i> = (1/N)\Sigma Yn_i$$

($\Sigma$ is a summation for $n=1, \ldots, N$.); and calculating, for subsequent use, the following square matrices:

$$C1 = \begin{pmatrix} C_{11} & C_{12} & C_{13} & C_{15} \\ C_{21} & C_{22} & C_{23} & C_{25} \\ C_{31} & C_{32} & C_{33} & C_{35} \\ C_{51} & C_{52} & C_{53} & C_{55} \end{pmatrix}$$

$$C2 = \begin{pmatrix} C_{11} & C_{12} \\ C_{21} & C_{22} \end{pmatrix}$$

$$C3 = \begin{pmatrix} C_{11} & C_{12} & C_{14} & C_{16} \\ C_{21} & C_{22} & C_{24} & C_{26} \\ C_{41} & C_{42} & C_{44} & C_{46} \\ C_{61} & C_{62} & C_{64} & C_{66} \end{pmatrix}$$

$$C4 = \begin{pmatrix} C_{11} & C_{13} & C_{14} & C_{15} \\ C_{31} & C_{33} & C_{34} & C_{35} \\ C_{41} & C_{43} & C_{44} & C_{45} \\ C_{51} & C_{53} & C_{54} & C_{55} \end{pmatrix}$$

$$C5 = \begin{pmatrix} C_{33} & C_{34} \\ C_{43} & C_{44} \end{pmatrix}$$

$$C6 = \begin{pmatrix} C_{22} & C_{23} & C_{24} & C_{26} \\ C_{32} & C_{33} & C_{34} & C_{36} \\ C_{42} & C_{43} & C_{44} & C_{46} \\ C_{62} & C_{63} & C_{64} & C_{66} \end{pmatrix}$$

$$C7 = \begin{pmatrix} C_{11} & C_{13} & C_{15} & C_{16} \\ C_{31} & C_{33} & C_{35} & C_{36} \\ C_{51} & C_{53} & C_{55} & C_{56} \\ C_{61} & C_{63} & C_{65} & C_{66} \end{pmatrix}$$

$$C8 = \begin{pmatrix} C_{55} & C_{56} \\ C_{65} & C_{66} \end{pmatrix},$$

$$C9 = \begin{pmatrix} C_{21} & C_{24} & C_{25} & C_{26} \\ C_{42} & C_{44} & C_{45} & C_{46} \\ C_{52} & C_{54} & C_{55} & C_{56} \\ C_{62} & C_{64} & C_{65} & C_{66} \end{pmatrix}.$$

3. A method as defined in claim 2, wherein said step of calculating the rigidity R comprises the step of calculating:

$$R = 1 - (R_1^1 + R_1^2 + R_2^1 + R_2^2 + R_3^1 + R_3^2)/6,$$

where $R_1^1 \equiv \det\{C1\}/(\det\{C2\}C_{33}C_{55})$,
$R_1^2 \equiv \det\{C3\}/(\det\{C2\}C_{44}C_{66})$,
$R_2^1 \equiv \det\{C4\}/(\det\{C5\}C_{11}C_{55})$,
$R_2^2 \equiv \det\{C6\}/(\det\{C5\}C_{22}C_{66})$,
$R_3^1 \equiv \det\{C7\}/(\det\{C8\}C_{11}C_{33})$, and
$R_3^2 \equiv \det\{C9\}/(\det\{C8\}C_{22}C_{44})$, where $\det\{M\}$ is a determinant of matrix M, $C_{ij}$ is an ij-element of said summed covariance matrix C.

4. A method as defined in claim 2, wherein said step of calculating the rigidity R comprises the step of calculating:

$$R = 1 - (R_1 + R_2 + R_3)/3,$$

where $R_1 \equiv \{\det\{C1\} + \det\{C3\}\}/\{\det\{C2\}(C_{33}C_{55} + C_{44}C_{66})\}$,
$R_2 \equiv \{\det\{C4\} + \det\{C6\}\}/\{\det\{C5\}(C_{11}C_{55} + C_{22}C_{66})\}$, and
$R_3 \equiv \{\det\{C7\} + \det\{C9\}\}/\{\det\{C8\}(C_{11}C_{33} + C_{22}C_{44})\}$.

5. A method as defined in claim 2, wherein said step of calculating the rigidity R comprises the step of calculating:

$$R = 1 - R_0,$$

where $R_0 = \{\det\{C1\} + \det\{C3\} + \det\{C4\} + \det\{C6\} + \det\{C7\} + \det\{C9\}\}/\{\det\{C2\}(C_{33}C_{55} + C_{44}C_{66}) + \det\{C5\}(C_{11}C_{55} + C_{22}C_{66}) + \det\{C8\}(C_{11}C_{33} + C_{22}C_{44})\}$.

6. A method as defined in claim 2, wherein said step of calculating the rigidity R comprises the step of calculating:

$$R = Q_1^1 + Q_1^2 + Q_2^1 + Q_2^2 + Q_3^1 + Q_3^2,$$

where $Q_1^1 \equiv \{(1-k)\det\{C2\}C_{33}C_{55} - \det\{C1\}\}/(1-k)\det\{C2\}C_{33}C_{55}$,
$Q_1^2 \equiv \{(1-k)\det\{C2\}C_{44}C_{66} - \det\{C3\}\}/(1-k)\det\{C2\}C_{44}C_{66}$,
$Q_2^1 \equiv \{(1-k)\det\{C5\}C_{11}C_{55} - \det\{C4\}\}/(1-k)\det\{C5\}C_{11}C_{55}$,
$Q_2^2 \equiv \{(1-k)\det\{C5\}C_{22}C_{66} - \det\{C6\}\}/(1-k)\det\{C5\}C_{22}C_{66}$,
$Q_3^1 \equiv \{(1-k)\det\{C8\}C_{11}C_{33} - \det\{C7\}\}/(1-k)\det\{C8\}C_{11}C_{33}$, and
$Q_3^2 \equiv \{(1-k)\det\{C8\}C_{22}C_{44} - \det\{C9\}\}/(1-k)\det\{C8\}C_{22}C_{44}$, where k is a constant that satisfies $0 < k < 1$.

7. A method as defined in claim 2, wherein said step of calculating the rigidity R comprises the step of calculating:

$$R = Q_1 + Q_2 + Q_3,$$

where $Q_1 \equiv \{(1-k)\det\{C2\}(C_{33}C_{55} + C_{44}C_{66}) - (\det\{C1\} + \det\{C3\})\}/(1-k)\det\{C2\}(C_{33}C_{55} + C_{44}C_{66})$,
$Q_2 \equiv \{(1-k)\det\{C5\}(C_{11}C_{55} + C_{22}C_{66}) - (\det\{C4\} + \det\{C6\})\}/(1-k)\det\{C5\}(C_{11}C_{55} + C_{22}C_{66})$, and
$Q_3 \equiv \{(1-k)\det\{C8\}(C_{11}C_{33} + C_{22}C_{44}) - (\det\{C7\} + \det\{C9\})\}/(1-k)\det\{C8\}(C_{11}C_{33} + C_{22}C_{44})$.

8. A method as defined in claim 2, wherein said step of calculating the rigidity comprises the step of calculating:

$$R = \{(1-k)\{\det\{C2\}(C_{33}C_{55} + C_{44}C_{66}) + \det\{C5\}(C_{11}C_{55} + C_{22}C_{66}) + \det\{C8\}(C_{11}C_{33} + C_{22}C_{44})\} - (\det\{C1\} + \det\{C3\} + \det\{C4\} + \det\{C6\} + \det\{C7\} + \det\{C9\})\}/(1-k)\{\det\{C2\}(C_{33}C_{55} + C_{44}C_{66}) + \det\{C5\}(C_{11}C_{55} + C_{22}C_{66}) + \det\{C8\}(C_{11}C_{33} + C_{22}C_{44})\}.$$

9. An apparatus, which uses three pictures in which a target object is recorded as substantially moved in distance, for checking the rigidity R of the target object without being affected by the resolution of the pictures, the apparatus comprising:

means for selecting N feature points of said target object and for generating, for each of said N feature points, a 6-D compound feature vector from three 2-D feature vectors each indicative of the position of said feature point in corresponding one of said three pictures;

means for calculating a sum of a covariance matrix of each of said compound feature vectors for said N feature points to provide a summed covariance matrix C;

means for calculating said rigidity R by using components of said summed covariance matrix C; and means for comparing said rigidity R with a predetermined threshold to determine whether said target object is a rigid body or not.

10. An apparatus as defined in claim 9, wherein said three feature vectors are $[Xn_1, Yn_1]$, $[Xn_2, Yn_2]$ and $[Xn_3, Yn_3]$, where $n = 1, \ldots, N$ and 1, 2 and 3 corresponds to said three pictures and wherein:

said means for generating a 6-D compound feature vector comprises means for generating a vector $[Xn_1, Yn_1, Xn_2, Yn_2, Xn_3, Yn_3]$; and said means for calculating a sum comprises:

means for calculating said summed covariance matrix C as follows:

$$C = \Sigma Un^{T} * Un,$$

where $\Sigma$ indicates a summation for $n = 1, \ldots, N$, $Un \equiv (Xn_1 - <X_1>, Yn_1 - <Y_1>, Xn_2 - <X_2>, Yn_2 - <Y_2>, Xn_3 - <X_3>, Yn_3 - <Y_3>)$, and $M^T$ is a transposed matrix of M, where $<X_i> = (1/N)\Sigma Xn_i$ $<Y_i> = (1/N)\Sigma Yn_i$ ($\Sigma$ is a summation for $n = 1, \ldots, N$.); and means for calculating, for subsequent use, the following square matrices:

$$C1 = \begin{pmatrix} C_{11} & C_{12} & C_{13} & C_{15} \\ C_{21} & C_{22} & C_{23} & C_{25} \\ C_{31} & C_{32} & C_{33} & C_{35} \\ C_{51} & C_{52} & C_{53} & C_{55} \end{pmatrix}$$

$$C2 = \begin{pmatrix} C_{11} & C_{12} \\ C_{21} & C_{22} \end{pmatrix}$$

$$C3 = \begin{pmatrix} C_{11} & C_{12} & C_{14} & C_{16} \\ C_{21} & C_{22} & C_{24} & C_{26} \\ C_{41} & C_{42} & C_{44} & C_{46} \\ C_{61} & C_{62} & C_{64} & C_{66} \end{pmatrix}$$

$$C4 = \begin{pmatrix} C_{11} & C_{13} & C_{14} & C_{15} \\ C_{31} & C_{33} & C_{34} & C_{35} \\ C_{41} & C_{43} & C_{44} & C_{45} \\ C_{51} & C_{53} & C_{54} & C_{55} \end{pmatrix}$$

$$C5 = \begin{pmatrix} C_{33} & C_{34} \\ C_{43} & C_{44} \end{pmatrix}$$

$$C6 = \begin{pmatrix} C_{22} & C_{23} & C_{24} & C_{26} \\ C_{32} & C_{33} & C_{34} & C_{36} \\ C_{42} & C_{43} & C_{44} & C_{46} \\ C_{62} & C_{63} & C_{64} & C_{66} \end{pmatrix}$$

$$C7 = \begin{pmatrix} C_{11} & C_{13} & C_{15} & C_{16} \\ C_{31} & C_{33} & C_{35} & C_{36} \\ C_{51} & C_{53} & C_{55} & C_{56} \\ C_{61} & C_{63} & C_{65} & C_{66} \end{pmatrix}$$

$$C8 = \begin{pmatrix} C_{55} & C_{56} \\ C_{65} & C_{66} \end{pmatrix},$$

$$C9 = \begin{pmatrix} C_{21} & C_{24} & C_{25} & C_{26} \\ C_{42} & C_{44} & C_{45} & C_{46} \\ C_{52} & C_{54} & C_{55} & C_{56} \\ C_{62} & C_{64} & C_{65} & C_{66} \end{pmatrix}.$$

11. An apparatus as defined in claim 10, wherein said means for calculating the rigidity R comprises means for calculating:

$$R = 1 - (R_1^1 + R_1^2 + R_2^1 + R_2^2 + R_3^1 + R_3^2)/6,$$

where $R_1^1 \equiv \det\{C1\}/(\det\{C2\}C_{33}C_{55})$,
$R_1^2 \equiv \det\{C3\}/(\det\{C2\}C_{44}C_{66})$,
$R_2^1 \equiv \det\{C4\}/(\det\{C5\}C_{11}C_{55})$,
$R_2^2 \equiv \det\{C6\}/(\det\{C5\}C_{22}C_{66})$,
$R_3^1 \equiv \det\{C7\}/(\det\{C8\}C_{11}C_{33})$, and
$R_3^2 \equiv \det\{C9\}/(\det\{C8\}C_{22}C_{44})$, where $\det\{M\}$ is a determinant of matrix M, $C_{ij}$ is an ij-element of said summed covariance matrix C.

12. An apparatus as defined in claim 10, wherein said means for calculating the rigidity R comprises means for calculating:

$$R = 1 - (R_1 + R_2 + R_3)/3,$$

where $R_1 \equiv \{\det\{C1\} + \det\{C3\}\}/\{\det\{C2\}(C_{33}C_{55} + C_{44}C_{66})\}$,
$R_2 \equiv \{\det\{C4\} + \det\{C6\}\}/\{\det\{C5\}(C_{11}C_{55} + C_{22}C_{66})\}$, and
$R_3 \equiv \{\det\{C7\} + \det\{C9\}\}/\{\det\{C8\}(C_{11}C_{33} + C_{22}C_{44})\}$.

13. An apparatus as defined in claim 10, wherein said means for calculating the rigidity R comprises means for calculating:

$$R = 1 - R_0,$$

where $R_0 = \{\det\{C1\} + \det\{C3\} + \det\{C4\} + \det\{C6\} + \det\{C7\} + \det\{C9\}\}/\{\det\{C2\}(C_{33}C_{55} + C_{44}C_{66}) + C_{44}C_{66}) + \det\{C5\}(C_{11}C_{55} + C_{22}C_{66}) + \det\{C8\}(C_{11}C_{33} + C_{22}C_{44})\}$.

14. An apparatus as defined in claim 10, wherein said means for calculating the rigidity R comprises means for calculating:

$$R = Q_1^1 + Q_1^2 + Q_2^1 + Q_2^2 + Q_3^1 + Q_3^2,$$

where $Q_1^1 \equiv \{(1-k)\det\{C2\}C_{33}C_{55} - \det\{C1\}\}/(1-k)\det\{C2\}C_{33}C_{55}$,
$Q_1^2 \equiv \{(1-k)\det\{C2\}C_{44}C_{66} - \det\{C3\}\}/(1-k)\det\{C2\}C_{44}C_{66}$,
$Q_2^1 \equiv \{(1-k)\det\{C5\}C_{11}C_{55} - \det\{C4\}\}/(1-k)\det\{C5\}C_{11}C_{55}$,
$Q_2^2 \equiv \{(1-k)\det\{C5\}C_{22}C_{66} - \det\{C6\}\}/(1-k)\det\{C5\}C_{22}C_{66}$,
$Q_3^1 \equiv \{(1-k)\det\{C8\}C_{11}C_{33} - \det\{C7\}\}/(1-k)\det\{C8\}C_{11}C_{33}$, and
$Q_3^2 \equiv \{(1-k)\det\{C8\}C_{11}C_{33} - \det\{C9\}\}/(1-k)\det\{C8\}C_{22}C_{44}$, where k is a constant that satisfied 0<k<1.

15. An apparatus as defined in claim 10, wherein said means for calculating the rigidity R comprises means for calculating:

$$R = Q_1 + Q_2 + Q_3,$$

where $Q_1 = \{(1-k)\det\{C2\}(C_{33}C_{55} + C_{44}C_{66}) - (\det\{C1\} + \det\{C3\})\}/(1-k)\det\{C2\}(C_{33}C_{55} + C_{44}C_{66})$,
$Q_2 = \{(1-k)\det\{C5\}(C_{11}C_{55} + C_{22}C_{66}) - (\det\{C4\} + \det\{C6\})\}/(1-k)\det\{C5\}(C_{11}C_{55} + C_{22}C_{66})$, and
$Q_3 = \{(1-k)\det\{C8\}(C_{11}C_{33} + C_{22}C_{44}) - (\det\{C7\} + \det\{C9\})\}/(1-k)\det\{C8\}(C_{11}C_{33} + C_{22}C_{44})$.

16. An apparatus as defined in claim 10, wherein said means for calculating the rigidity comprises means for calculating:

$$R = \{(1 - k)\{det\{C2\}(C_{33}C_{55} + C_{44}C_{66}) +$$
$$det\{C5\}(C_{11}C_{55} + C_{22}C_{66}) + det\{C8\}(C_{11}C_{33} + C_{22}C_{44})\} -$$
$$(det\{C1\} + det\{C3\} + det\{C4\} + det\{C6\} + det\{C7\} +$$
$$det\{C9\})\}/(1 - k)\{det\{C2\}(C_{33}C_{55} + C_{44}C_{66}) +$$
$$det\{C5\}(C_{11}C_{55} + C_{22}C_{66}) + det\{C8\}(C_{11}C_{33} + C_{22}C_{44})\}.$$

17. A self-propelled robot provided with an apparatus as defined in claim 9, the robot comprising:
   means for supplying said selecting and generating means with images of said target object;
   a controller for controlling the robot in response to the determination by said comparing means.

18. A self-propelled vehicle provided with an apparatus as defined in claim 9, the vehicle comprising:

means for supplying said selecting and generating means with images of said target object;

a controller for controlling the vehicle in response to the determination by said comparing means.

* * * * *